(12) United States Patent
Bauer et al.

(10) Patent No.: US 7,622,517 B2
(45) Date of Patent: Nov. 24, 2009

(54) PHOSPHORUS-CONTAINING FLAME RETARDANT FORMULATION FOR CELLULOSE-CONTAINING MOLDINGS

(75) Inventors: Harald Bauer, Kerpen (DE); Werner Krause, Huerth (DE); Martin Sicken, Cologne (DE); Volker Thewes, Erfstadt (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 0 days.

(21) Appl. No.: 12/148,391

(22) Filed: Apr. 18, 2008

(65) Prior Publication Data

US 2009/0005471 A1    Jan. 1, 2009

Related U.S. Application Data

(62) Division of application No. 11/093,599, filed on Mar. 30, 2005, now abandoned.

(30) Foreign Application Priority Data

Mar. 30, 2005   (DE) .................. 10 2004 015 356

(51) Int. Cl.
*C08L 1/00* (2006.01)
*C08K 5/5313* (2006.01)

(52) U.S. Cl. .................. 524/13; 524/14; 524/35; 524/126; 524/133

(58) Field of Classification Search .......... 524/13, 524/14, 35, 126, 133
See application file for complete search history.

(56) References Cited

U.S. PATENT DOCUMENTS

| 3,939,107 A | 2/1976 | Brown |
| 4,073,617 A | 2/1978 | LeBlanc et al. |
| 4,219,456 A | 8/1980 | Langer |
| 4,435,533 A | 3/1984 | Tsolis et al. |
| 5,389,309 A | 2/1995 | Lopez |
| 6,255,371 B1 | 7/2001 | Schlosser et al. |
| 6,365,071 B1 | 4/2002 | Jenewein et al. |
| 6,617,382 B1 | 9/2003 | Pirig et al. |
| 7,144,527 B2 | 12/2006 | Thewes et al. |
| 7,148,276 B2 | 12/2006 | Bauer et al. |
| 7,169,838 B2 * | 1/2007 | Engelmann et al. .......... 524/126 |
| 7,205,346 B2 * | 4/2007 | Harashina ................... 524/133 |
| 7,208,539 B2 | 4/2007 | Tsuchikawa et al. |
| 2004/0021135 A1 | 2/2004 | Steenbakkers-Menting et al. |
| 2004/0051087 A1 * | 3/2004 | Thewes et al. .............. 252/606 |
| 2005/0014875 A1 | 1/2005 | Knop |
| 2005/0143503 A1 | 6/2005 | Bauer et al. |
| 2005/0173684 A1 | 8/2005 | Schlosser et al. |
| 2005/0234173 A1 | 10/2005 | Tsuchikawa et al. |

FOREIGN PATENT DOCUMENTS

| DE | 4101539 | 7/1992 |
| DE | 19614424 | 10/1997 |
| DE | 10241375 | 3/2004 |
| DE | 10243231 | 3/2004 |
| EP | 1229165 | 8/2002 |
| EP | 1400573 | 9/2003 |
| GB | 1055555 | 1/1967 |
| JP | 2002-113017 | 4/2002 |
| WO | WO 98/24604 | 6/1998 |

OTHER PUBLICATIONS

German Office Action for DE 102004015356,mailed Nov. 17, 2004.
U.S. Appl. No. 10/794,019, by Sicken et al., filed Mar. 5, 2004.
EP Search Report for EP 05006204, mailed Nov. 18, 2005.
U.S. Appl. No. 11/182,693, by Bauer et al., filed Jul. 15, 2005.

* cited by examiner

*Primary Examiner*—Peter Szekely
(74) *Attorney, Agent, or Firm*—Anthony A. Bisulca

(57) ABSTRACT

The invention relates to a phosphorus-containing flame retardant formulation for cellulose-containing moldings, comprising
from 0.1 to 99.9% by weight of a resin of an organic nitrogen compound and
from 0.1 to 99.9% by weight of a phosphorus-containing flame retardant.

31 Claims, No Drawings

PHOSPHORUS-CONTAINING FLAME RETARDANT FORMULATION FOR CELLULOSE-CONTAINING MOLDINGS

CROSS-REFERENCE TO RELATED APPLICATION

This application is a divisional application of U.S. patent application Ser. No. 11/093,599, filed Mar. 30, 2005 now abandoned by Bauer et al.

The present invention is described in the German priority application No. 102004015356.6, filed Mar. 30, 2004, which is hereby incorporated by reference as is fully disclosed herein.

The invention relates to a phosphorus-containing flame retardant formulation for cellulose-containing materials, to a process for preparation of this flame retardant formulation, and to its use.

U.S. Pat. No. 5,389,309 discloses flame retardant formulations based on diammonium phosphates for textiles, wood, and paper.

WO-A-98/24604 discloses flame-retardant impregnation materials for wood, paper, and textiles, based on ammonium phosphates, on phosphoric acid, and on water-soluble salts which with phosphate ions can form salts insoluble in water.

The disadvantage of flame retardants based on ammonium (poly)phosphate is the intumescence (expansion) effect which begins even at relatively low temperatures, and residual solubility of up to 10% by weight (based on ammonium phosphate) of the ammonium polyphosphate in water.

It is an object of the invention to provide, for cellulose-containing materials, a phosphorus-containing flame retardant formulation which has good flame-retardant action when relatively small amounts are used, without expansion, and which has low residual water solubility.

Surprisingly, it has been found that the phosphorus-containing flame retardant formulation used according to the invention has lower water solubility than comparable systems based on phosphoric acid and/or on ammonium phosphates.

Thermal stability was also found to be markedly higher in comparison with systems based on ammonium phosphate.

The invention therefore provides a phosphorus-containing flame retardant formulation for cellulose-containing materials, comprising from 0.1 to 99.9% by weight of a resin of an organic nitrogen compound and from 0.1 to 99.9% by weight of a phosphorus-containing flame retardant.

The phosphorus-containing flame retardant preferably comprises a particulate phosphorus-containing flame retardant.

The particulate phosphorus-containing flame retardant preferably comprises a phosphinic salt of the formula (I) and/or a diphosphinic salt of the formula (II) and/or polymers of these

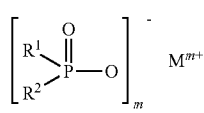
(I)

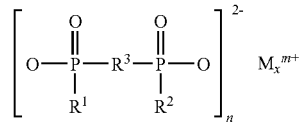
(II)

where
$R^1$ and $R^2$ are identical or different and are $C_1$-$C_6$-alkyl, linear or branched, and/or aryl; $R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Fe, Zr, Ce, Bi, Sr, Mn, Li and/or a protonated nitrogen base; m is from 1 to 4; n is from 1 to 4; x is from 1 to 4.

$R^1$ and $R^2$, identical or different, are preferably $C_1$-$C_6$-alkyl, linear or branched, and/or phenyl.

$R^1$ and $R^2$, identical or different, are preferably methyl, ethyl, n-propyl, isopropyl, n-butyl, tert-butyl, n-pentyl and/or phenyl.

$R^3$ is preferably methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene, or tert-butylnaphthylene; phenylmethylene, phenylethylene, phenylpropylene, or phenylbutylene.

The material preferably comprises a single-component flame retardant formulation which is composed of from 0.1 to 99.9% by weight of resin of an organic nitrogen compound and from 0.1 to 99.9% by weight of particulate phosphorus-containing flame retardant, preferably of from 4.4 to 82.3% by weight of a resin of an organic nitrogen compound and from 95.6 to 17.7% by weight of particulate phosphorus-containing flame retardant, and particularly preferably of from 18.8 to 69.9% by weight of a resin of an organic nitrogen compound and from 81.2 to 30.1% by weight of particulate phosphorus-containing flame retardant.

The inventive flame retardant formulation preferably has thermal stability extending to 200-500° C., particularly preferably 250-400° C.

The solubility of the particulate flame retardant is preferably from 0.001 to 15% by weight in water and/or in organic solvents, such as alcohols, glycols, aliphatic hydrocarbons, aromatic, hydrocarbons, halogenated hydrocarbons, alicyclic hydrocarbons, ethers, glycol ethers, ketones, esters, and/or carboxylic acids, preferably from 0.1 to 9.9% by weight.

The median particle size $d_{50}$ of the particulate flame retardant is from 1 nm to 5 mm, preferably from 100 nm to 100 μm, and particularly preferably from 1 to 20 μm.

In another embodiment of the invention, the phosphorus-containing flame retardant comprises a non-particulate phosphorus-containing flame retardant.

The non-particulate phosphorus-containing flame retardant preferably comprises a phosphinic acid and/or phosphinic salt of the formula (I) and/or a diphosphinic acid and/or diphosphinic salt of the formula (II) and/or polymers of these, where $R^1$, $R^2$, and $R^3$ are as defined and M is Na, K, or H, and m is 1; n is 1; x is 1.

The phosphorus-containing flame retardant formulation preferably also comprises an aluminum compound, titanium compound, zinc compound, tin compound, and/or zirconium compound.

The phosphorus-containing flame retardant formulation preferably comprises a single-component flame retardant formulation which is composed of from 0.1 to 99.9% by weight of resin of an organic nitrogen compound and from 0.1 to 99.9% by weight of non-particulate phosphorus-containing flame retardant, preferably of from 4.4 to 82.3% by weight of a resin of an organic nitrogen compound and from 95.6 to 17.7% by weight of non-particulate phosphorus-containing flame retardant, and particularly preferably of from 18.8 to 69.9% by weight of a resin of an organic nitrogen compound and from 81.2 to 30.1% by weight of non-particulate phosphorus-containing flame retardant.

In another embodiment, the phosphorus-containing flame retardant formulation comprises a two-component phosphorus-containing flame retardant formulation which is composed of from 0.1 to 99.9% by weight of a component A and from 0.1 to 99.9% by weight of a component B, where component A is composed of from 0.1 to 99.9% by weight of resin of an organic nitrogen compound and from 0.1 to 99.9% by weight of non-particulate phosphorus-containing flame retardant, and component B is an aluminum compound and/or titanium compound and/or zinc compound and/or tin compound and/or zirconium compound.

The two-component phosphorus-containing flame retardant formulation is preferably composed of from 68.9 to 94.2% by weight of a component A and from 31.1 to 5.83% by weight of a component B, where component A is composed of from 93.7 to 12.9% by weight of resin of an organic nitrogen compound and from 6.3 to 87.1% by weight of non-particulate phosphorus-containing flame retardant, and component B is an aluminum compound and/or titanium compound and/or zinc compound and/or tin compound and/or zirconium compound.

The two-component phosphorus-containing flame retardant formulation is preferably composed of from 68.9 to 87.9% by weight of a component A and from 31.1 to 12.1% by weight of a component B, where component A is composed of from 93.7 to 1.5% by weight of resin of an organic nitrogen compound and from 6.3 to 98.5% by weight of non-particulate phosphorus-containing flame retardant, and component B is an aluminum compound and/or titanium compound and/or zinc compound and/or tin compound and/or zirconium compound.

In another embodiment, the phosphorus-containing flame retardant formulation comprises a two-component phosphorus-containing flame retardant formulation which is composed of from 0.1 to 99.9% by weight of a component C and from 0.1 to 99.9% by weight of a component D, where component C is composed of from 0.1 to 99.9% by weight of resin of an organic nitrogen compound and from 0.1 to 99.9% by weight of an aluminum compound and/or titanium compound and/or zinc compound and/or tin compound and/or zirconium compound, and component D is a non-particulate phosphorus-containing flame retardant.

The two-component phosphorus-containing flame retardant formulation is preferably composed of from 13.3 to 95.6% by weight of a component C and from 86.7 to 4.4% by weight of a component D, where component C is composed of from 9.6 to 67.5% by weight of resin of an organic nitrogen compound and from 90.4 to 32.5% by weight of an aluminum compound and/or titanium compound and/or zinc compound and/or tin compound and/or zirconium compound, and component D is a non-particulate phosphorus-containing flame retardant.

The two-component phosphorus-containing flame retardant formulation is preferably composed of from 22.3 to 86.8% by weight of a component C and from 77.7 to 13.2% by weight of a component D, where component C is composed of from 51.5 to 67.5% by weight of resin of an organic nitrogen compound and from 48.5 to 32.5% by weight of an aluminum compound and/or titanium compound and/or zinc compound and/or tin compound and/or zirconium compound, and component D is a non-particulate phosphorus-containing flame retardant.

In another embodiment, the phosphorus-containing flame retardant formulation comprises a three-component phosphorus-containing flame retardant formulation which is composed of from 0.1 to 99.9% by weight of a component E, a resin of an organic nitrogen compound, from 0.1 to 99.9% by weight of a component D, a non-particulate phosphorus-containing flame retardant, and from 0.1 to 99.9% by weight of a component B, an aluminum compound and/or titanium compound and/or zinc compound and/or tin compound and/or zirconium compound.

The material preferably comprises a three-component phosphorus-containing flame retardant formulation which is composed of from 1 to 65% by weight of a component E, a resin of an organic nitrogen compound, from 4 to 87% by weight of a component D, a non-particulate phosphorus-containing flame retardant, and from 12 to 32% by weight of a component B, an aluminum compound and/or titanium compound and/or zinc compound and/or tin compound and/or zirconium compound.

The material preferably comprises a three-component phosphorus-containing flame retardant formulation which is composed of from 11 to 59% by weight of a component E, a resin of an organic nitrogen compound, from 13 to 78% by weight of a component D, a non-particulate phosphorus-containing flame retardant, and from 12 to 38% by weight of a component B, an aluminum compound and/or titanium compound and/or zinc compound and/or tin compound and/or zirconium compound.

The resins of an organic nitrogen compound preferably comprise resins and/or condensates of carbonyl compounds with organic nitrogen compounds, e.g. urea, substituted urea derivatives, thiourea, guanidine, substituted guanadine derivatives, biguanide, melamine, substituted melamine derivatives, condensates of melamine and higher-level-condensation products thereof, melamine-phenol systems, benzoguanamine, acetoguanamine, urethanes, cyanamide, dicyandiamide, aniline, sulfonamide, biuret, allantoin, tolyltriazole, benzotriazole, 2-amino-4-methylpyrimidine, hydantoin, substituted hydantoin derivatives, malonamide amidine, ethylenebis-5-triazone, glycine anhydride, and any desired mixtures thereof.

The resins of the organic nitrogen compound preferably comprise dicyandiamide resins composed of 1 mol of dicyandiamide and from 1 to 10 mol of formaldehyde, preferably of 1 mol of dicyandiamide and from 1 to 4 mol of formaldehyde.

The solubility of the non-particulate flame retardant is preferably from 20 to 100% by weight in water and/or in organic solvents, such as alcohols, glycols, aliphatic hydrocarbons, aromatic hydrocarbons, halogenated hydrocarbons, alicyclic hydrocarbons, ethers, glycol ethers, ketones, esters, and/or carboxylic acids.

The invention also provides a process for preparation of a phosphorus-containing flame retardant formulation, which comprises mixing the organic nitrogen compounds (e.g. dicyandiamide), formaldehyde and, if appropriate, solvents at from 10 to 300° C. for from 0.1 to 100 h, where the mixing process incorporates mono- or polyfunctional amines, and also particulate and/or non-particulate phosphorus-containing flame retardants and, if appropriate, aluminum compounds and/or titanium compounds and/or zinc compounds and/or tin compounds and/or zirconium compounds.

The process for preparation of a phosphorus-containing flame retardant formulation composed of components A and B is preferably one wherein, for preparation of component A, dicyandiamide, formaldehyde, and solvent, and optionally mono- or polyfunctional amines are mixed at from 10 to 300° C. for from 0.1 to 100 h, and the non-particulate phosphorus-containing flame retardant is added, and then mixing to incorporate aluminum compounds and/or titanium compounds and/or zinc compounds and/or tin compounds and/or zirconium compounds are incorporated by mixing for component B.

The process for preparation of a phosphorus-containing flame retardant formulation composed of components C and D is preferably one wherein, for preparation of component A, dicyandiamide, formaldehyde, and solvent, and optionally mono- or polyfunctional amines are mixed at from 10 to 300° C. for from 0.1 to 100 h, and aluminum compounds and/or titanium compounds and/or zinc compounds and/or tin compounds and/or zirconium compounds are added, and then the non-particulate phosphorus-containing flame retardants are incorporated by mixing for component D.

The process for preparation of a phosphorus-containing flame retardant formulation composed of components E, D and B is preferably one wherein, for preparation of component E, dicyandiamide, formaldehyde, and solvent, and optionally mono- or polyfunctional amines are mixed at from 10 to 300° C. for from 0.1 to 100 h, then the non-particulate phosphorus-containing flame retardant is added as component D, and finally aluminum compounds and/or titanium compounds and/or zinc compounds and/or tin compounds and/or zirconium compounds are incorporated by mixing as component B.

The pH is preferably adjusted via mixing to incorporate pH modifiers at from 10 to 300° C. for from 0.1 to 100 h, preferably to a pH of from 8 to 13.

Finally, the invention also provides the use of the inventive phosphorus-containing flame retardant formulation for providing flame retardancy to paper, cardboard, paperboard, textiles, wood, and other cellulose-containing materials.

The use for providing flame retardancy to paper, cardboard, and paperboard is preferably one wherein a phosphorus-containing flame retardant formulation, composed of the resin of an organic nitrogen compound and of particulate phosphorus-containing flame retardant, is added to the fiber suspension during engine sizing.

The use for providing flame retardancy to paper, cardboard and paperboard is preferably one wherein a phosphorus-containing flame retardant formulation, composed of the resin of an organic nitrogen compound and of non-particulate phosphorus-containing flame retardant, is added to the fiber suspension during engine sizing.

The use for providing flame retardancy to paper, cardboard, and paperboard is preferably one wherein a two-component phosphorus-containing flame retardant formulation, composed of components A and B, is added to the fiber suspension during engine sizing.

The use for providing flame retardancy to paper, cardboard, and paperboard is preferably one wherein a two-component phosphorus-containing flame retardant formulation, composed of components C and D, is added to the fiber suspension during engine sizing.

The use for providing flame retardancy to paper, cardboard and paperboard is preferably one wherein a three-component phosphorus-containing flame retardant formulation, composed of components E, D, and B, is added to the fiber suspension during engine sizing.

The use for providing flame retardancy to textiles is preferably one wherein a phosphorus-containing flame retardant formulation is applied in the form of an impregnating solution to the fabric.

This use is preferably one wherein the impregnating solution is applied via immersion or via spray-application onto the fabric.

The use for providing flame retardancy to wood is preferably one wherein the wood is introduced into an impregnating system and is exposed for at least 20 minutes to a pressure of 50 mbar, the wood being impregnated at a pressure of 16 bar for from 1 to 10 hours with an impregnating solution which comprises an inventive phosphorus-containing flame retardant formulation.

The use for providing flame retardancy to wood is preferably one wherein the wood is coated via dipping processes, spraying processes, or spreading processes, where the coating component comprises an inventive phosphorus-containing flame retardant formulation.

The invention also provides flame-retardant cellulose-containing moldings which comprise:
from 0.01 to 90% by weight of cellulose
from 0.01 to 90% by weight of resin of an organic nitrogen compound
from 0.01 to 90% by weight of non-particulate phosphorus-containing flame retardant from 0.01 to 90% by weight of aluminum compound and/or titanium compound and/or zinc compound and/or tin compound and/or zirconium compound.

The invention also provides flame-retardant cellulose-containing moldings which comprise:
from 0.01 to 90% by weight of cellulose
from 0.01 to 90% by weight of resin of an organic nitrogen compound
from 0.01 to 90% by weight of particulate phosphorus-containing flame retardant.

The invention also provides flame-retardant cellulose-containing moldings which comprise:
from 1 to 50% by weight of cellulose
from 1 to 30% by weight of dicyandiamide-formaldehyde resin
from 1 to 50% by weight of particulate phosphorus-containing flame retardant.

The invention also provides flame-retardant cellulose-containing moldings which comprise:
from 1 to 50% by weight of cellulose
from 1 to 30% by weight of melamine-formaldehyde resin
from 1 to 50% by weight of particulate phosphorus-containing flame retardant.

All of the cellulose-containing materials and moldings may comprise paper, cardboard and paperboard, wallpapers, veneer wood, plywood, blockboard, laminated wood, particle board, wood-fiber board (hard, medium-hardness, and porous), polymer-treated wood, parquet, composite wood products, chopped wood, timber, sawn timber boards, sawn construction-grade timber, etc.

Preferred resins of an organic nitrogen compound are resins and/or condensates of carbonyl compounds with urea, substituted urea derivatives (e.g. dimethylurea, N,N'-diphenylurea, benzylurea, acetyleneurea, tetramethylurea), thiourea, guanidine, substituted guanidine derivatives (e.g. alkylguanidine, arylguanidine, diphenylguanidine), biguanide, melamine, substituted melamine derivatives (e.g. ethylenedimelamine), condensates of melamine, e.g. melem, melam, or melon, or compounds of this type with a higher degree of condensation, melamine-phenol systems, benzoguanamine, acetoguanamine, urethanes, cyanamide, dicyandiamide, aniline, sulfonamide, biuret, allantoin, tolyltriazole, benzotriazole, 2-amino-4-methylpyrimidine, hydantoin, substituted hydantoin derivatives (e.g. 5,5-diphenylhydantoin), malonamide amidine, ethylenebis-5-triazone, glycine anhydride, and any desired mixtures thereof.

Preferred carbonyl compounds are aldehydes. Particular preference is given here to aliphatic aldehydes, e.g. formaldehyde, acetaldehyde, propionaldehyde, etc.

Very particular preference is given to combinations composed of dicyandiamide resins and of particulate phosphorus-containing flame retardant.

For the inventive single-component phosphorus-containing flame retardant formulations here, preference is given to combinations composed of from 0.05 to 20 mol of dicyandiamide (base material for resin) per mole of particulate phosphorus-containing flame retardant, and particular preference is given to combinations of from 0.1 to 10 mol of dicyandiamide (resin base material) per mole of particulate phosphorus-containing flame retardant, and in particular preference is given to combinations of from 0.5 to 5 mol of dicyandiamide (resin base material) per mole of particulate phosphorus-containing flame retardant.

For the composition of the inventive single-component phosphorus-containing flame retardant formulation composed of a resin of an organic nitrogen compound and of non-particulate phosphorus-containing flame retardant, the individual components are preferably:
a) from 0.05 to 20 mol of dicyandiamide (resin base material) per mole of non-particulate phosphorus-containing flame retardant, particularly preferably
b) from 0.1 to 10 mol of dicyandiamide (resin base material) per mole of non-particulate phosphorus-containing flame retardant, and in particular
c) from 0.5 to 5 mol of dicyandiamide (resin base material) per mole of non-particulate phosphorus-containing flame retardant.

For the two-component phosphorus-containing flame retardant formulations composed of component A, of the resin of an organic nitrogen compound, and of a non-particulate phosphorus-containing flame retardant, and of component B, an aluminum compound, preference is given according to the invention to:
a) from 0.05 to 20 mol of dicyandiamide (resin base material) for each 3-3.3 mol of phosphorus in the non-particulate phosphorus-containing flame retardant per mole of aluminum,
b) from 0.1 to 10 mol of dicyandiamide (resin base material) for each 3-3.3 mol of phosphorus in the non-particulate phosphorus-containing flame retardant per mole of aluminum, in particular
c) from 0.5 to 5 mol of dicyandiamide (resin base material) for each 3-3.3 mol of phosphorus in the non-particulate phosphorus-containing flame retardant per mole of aluminum.

For the other two-component phosphorus-containing flame retardant formulations composed of component C, of a resin of an organic nitrogen compound, and of an aluminum compound, and of component D, a non-particulate phosphorus-containing flame retardant, preference is given according to the invention to:
a) from 0.05 to 20 mol of dicyandiamide for each 3-3.3 mol of phosphorus in the non-particulate phosphorus-containing flame retardant per mole of aluminum, preferably
b) from 0.05 to 10 mol of dicyandiamide for each 3-3.3 mol of phosphorus in the non-particulate phosphorus-containing flame retardant per mole of aluminum, in particular
c) from 0.05 to 5 mol of dicyandiamide for each 3-3.3 mol of phosphorus in the non-particulate phosphorus-containing flame retardant per mole of aluminum.

According to the invention, preference is also given to a three-component phosphorus-containing flame retardant formulation composed of component E, of a resin of an organic nitrogen compound, of component D, a non-particulate phosphorus-containing flame retardant, and of component C, an aluminum compound, its composition being as follows, based on the individual components:
a) from 0.05 to 20 mol of dicyandiamide for each 3-3.3 mol of phosphorus in the non-particulate phosphorus-containing flame retardant per mole of aluminum, preferably
b) from 0.05 to 10 mol of dicyandiamide for each 3-33 mol of phosphorus in the non-particulate phosphorus-containing flame retardant per mole of aluminum, in particular
c) from 0.05 to 5 mol of dicyandiamide for each 3-3.3 mol of phosphorus in the non-particulate phosphorus-containing flame retardant per mole of aluminum.

If the two-component phosphorus-containing flame retardant formulation comprises a formulation composed of component A, a resin of an organic nitrogen compound, and of a non-particulate phosphorus-containing flame retardant, and of a component B, a zinc compound, the compositions are then:
a) from 0.05 to 20 mol of dicyandiamide, preferably
b) from 0.1 to 10 mol of dicyandiamide, in particular
c) from 0.5 to 5 mol of dicyandiamide, for each 2-2.2 mol of phosphorus in the non-particulate phosphorus-containing flame retardant per mole of zinc.

The compositions for the other inventive two-component phosphorus-containing flame retardant formulation composed of component C, of a resin of an organic nitrogen compound, and of a zinc compound, and of a component D, a non-particulate phosphorus-containing flame retardant are likewise
a) from 0.05 to 20 mol of dicyandiamide, preferably
b) from 0.1 to 10 mol of dicyandiamide, in particular
c) from 0.5 to 5 mol of dicyandiamide per 1 mole of zinc for each 2-2.2 mol of phosphorus in the non-particulate phosphorus-containing flame retardant.

According to the invention, preference is also given to a three-component phosphorus-containing flame retardant formulation composed of component E, of a resin of an organic nitrogen compound, of component D, a non-particulate phosphorus-containing flame retardant, and of component C, a zinc compound, and having the following composition, based on the individual components:
a) from 0.05 to 20 mol of dicyandiamide for each 2- to 2.2 mol of phosphorus in the non-particulate phosphorus-containing flame retardant per mole of zinc, preferably
b) from 0.05 to 10 mol of dicyandiamide for each 2-2.2 mol of phosphorus in the non-particulate phosphorus-containing flame retardant per mole of zinc, in particular
c) from 0.05 to 5 mol of dicyandiamide for each 2-2.2 mole of phosphorus in the non-particulate phosphorus-containing flame retardant per mole of zinc.

If the two-component phosphorus-containing flame retardant formulation comprises a formulation composed of component A, a resin of an organic nitrogen compound, and a non-particulate phosphorus-containing flame retardant, and of a component B, a titanium compound, or comprises the other two-component phosphorus-containing flame retardant formulation composed of component C, a resin of an organic nitrogen compound, and a titanium compound, and also of a component D, a non-particulate phosphorus-containing flame retardant, or comprises a three-component phosphorus-containing flame retardant formulation composed of component E, a resin of an organic nitrogen compound, of component D, a non-particulate phosphorus-containing flame retardant, and of component C, a titanium compound, these flame retardant formulations have the following compositions:
a) from 0.05 to 20 mol of dicyandiamide, preferably
b) from 0.1 to 10 mol of dicyandiamide in particular
c) from 0.5 to 5 mol of dicyandiamide, for each 2-2.2 mol of phosphorus in the non-particulate phosphorus-containing flame retardant, for each 0.5 mol of titanium.

The dicyandiamide resins are prepared via reaction of 1 mol of dicyandiamide with from 1 to 4 mol of formaldehyde at a pH of from 8 to 13 optionally in the presence of from 0.1 to 2 mol of an inorganic or organic acid and/or optionally of an ammonium or amine salt of an inorganic or organic acid, and/or optionally from 0.05 to 0.5 mol of a mono- or polyfunctional amine.

Inorganic acids which may in particular be used here are hydrochloric, sulfuric, nitric, and phosphoric acid, and organic acids which may be used here are formic, acetic, or oxalic acid, phosphinic acids, and phosphonous acids.

The pH may optionally be adjusted via addition of pH modifiers. Preferred pH modifiers are ammonium hydroxide, ammonium chloride, ammonium carbonate, ammonium nitrate, and ammonium sulfate, and ammonium formate and ammonium acetate.

Other preferred pH modifiers are the conventional alkalis, e.g. the hydroxides, carbonates, and/or hydroxide carbonates of alkali metals and of alkaline earth metals. Other preferred pH modifiers are amine salts, such as ethylenediamine formate, or triethylenetetramine hydrochloride.

The preferred mono- or polyfunctional amines are ethylenediamine, propylenediamine, diethylenetriamine, and triethylenetetramine, and substituted derivatives, such as mono- or diethanolamine.

The dicyandiamide-formaldehyde resins are preferably used in the form of 10-60% strength by weight aqueous solutions.

Protonated nitrogen bases are preferably the protonated bases of ammonia, melamine, triethanolamine, in particular $NH_4^+$.

Inventive solvents are preferably water, alcohols, e.g. methanol, n-propyl alcohol, isopropyl alcohol, n-butanol, isobutanol, amyl alcohol, etc.

Preference is also given to aliphatic hydrocarbons, such as hexane, heptane, octane, and petroleum ether; aromatic hydrocarbons, such as benzene, toluene, xylene, ethylbenzene, diethylbenzene and chlorobenzene; halogenated hydrocarbons, such as methylene chloride, chloroform, 1,2-dichloroethane, chlorobenzene, etc., carbon tetrachloride, tetrabromoethylene; alicyclic hydrocarbons, such as cyclopentane, cyclohexane, and methylcyclohexane; ketones, such as diisobutyl ketone and methyl n-propyl ketone; esters, such as n-propyl acetate and n-butyl acetate; carboxylic acids. One or more of these compounds may be used alone or combined.

Metals or metal compounds used:

Metallic aluminum is preferred. Aluminum salts with anions of the seventh main group are also preferred, examples being aluminum fluoride, aluminum fluoride trihydrate, aluminum chloride (anhydrous, crystallized; anhydrous, anhydrous, sublimed), aluminum chloride hexahydrate, aluminum hydroxy chloride, ALCHLOR®-AC from Hardman Australia, basic aluminum chloride solution, aluminum chloride solution and polyaluminum chloride solution, sulfate-conditioned (PACS) from Lurgi Lifescience, OBRAFLOC 18 from Oker Chemie GmbH, Alkaflock®, Ekocid® 60 grades, Sachtoklar® grades, Ekofloc grades, Ekozet grades from Sachtleben, anhydrous aluminum bromide, aluminum iodide, aluminum iodide hexahydrate.

The ratio of polyaluminum hydroxy compound to cationic dicyandiamide resin may vary within wide limits, but an aluminum:dicyandiamide molar ratio of from 4:1 to 1:4 has proven particularly advantageous in practice.

Preference is given to aluminum salts with anions of the sixth main group, e.g. aluminum sulfide, aluminum selenide, and aluminum salts with anions of the fifth main group, e.g. aluminum phosphide, aluminum hypophosphite, aluminum antimonide, aluminum nitride, and also aluminum salts with anions of the fourth main group, e.g. aluminum carbide, aluminum hexafluorosilicate, and aluminum salts with anions of the first main group, e.g. aluminum hydride, aluminum calcium hydride, aluminum borohydride.

Preference is given to aluminum salts of the oxo acids of the seventh main group, e.g. aluminum chlorate, and also aluminum salts of the oxo acids of the sixth main group, e.g. aluminum sulfate, aluminum sulfate hydrate, aluminum sulfate hexahydrate, aluminum sulfate hexadecahydrate, aluminum sulfate octadeca hydrate, aluminum sulfate solution from Ekachemicals, liquid aluminum sulfate from Oker Chemie GmbH, sodium aluminum sulfate, sodium aluminum sulfate dodecahydrate, aluminum potassium sulfate, aluminum potassium sulfate dodecahydrate, aluminum ammonium sulfate, aluminum ammonium sulfate dodecahydrate, magaldrate ($Al_5 Mg_{10}(OH)_{31}(SO_4)_2 \times nH_2O$).

Preference is given to aluminum salts of the oxo acids of the fifth main group, e.g. aluminum nitrate nonahydrate, aluminum metaphosphate, aluminum phosphate, low-density aluminum phosphate hydrate, monobasic aluminum phosphate, monobasic aluminum phosphate solution, and aluminum salts of the oxo acids of the fourth main group, e.g. aluminum silicate, aluminum magnesium silicate, aluminum magnesium silicate hydrates (almasilate), aluminum carbonates, hydrotalcites ($Mg_6Al_2(OH)_{16}CO_3 \cdot nH_2O$), dihydroxyaluminum sodium carbonate, $NaAl(OH)_2CO_3$, and aluminum salts of the oxo acids of the third main group, e.g. aluminum borate.

Preference is given to aluminum salts of the pseudohalides, e.g. aluminumthiocyanate, and aluminum oxides (purum, purissimum, technical, basic, neutral, acidic), aluminum oxide hydrate, aluminum hydroxides, or mixed aluminum oxide hydroxides and polyaluminum hydroxy compounds, which preferably have an aluminum content of from 9 to 40% by weight.

Preferred aluminum salts are those having organic anions, e.g. the salts of mono-, di-, oligo-, or polycarboxylic acids, for example aluminum diacetate, basic aluminum acetate, aluminum subacetate, aluminum acetotartrate, aluminum formate, aluminum lactate, aluminum oxalate, aluminum tartrate, aluminum oleate, aluminium palmitate, aluminum monostearate, aluminum stearate, aluminum trifluoromethanesulfonate, aluminum benzoate, aluminum salicylate, aluminum hexaurea sulfate triiodide, aluminum 8-hydroxyquinolate.

Other preferred aluminum compounds are aluminum acetylacetonate, alkylaluminum compounds, alkylaluminum chlorides, aluminum tert-butoxide, aluminum ethoxide, aluminum isopropoxide, aluminum sec-butoxide.

The aluminum content of preferred aluminum salts is from 9 to 40% by weight (based on dry weight).

Preference is given to elemental, metallic zinc and zinc salts having inorganic anions, e.g. zinc halides (zinc fluoride, zinc fluoride tetrahydrate, zinc chlorides (butter of zinc), bromides, zinc iodide), etc.

Preference is given to zinc salts of the oxo acids of the third main group (zinc borate, e.g. Firebrake ZB, Firebrake 415), and zinc salts of the oxo acids of the fourth main group (basic zinc carbonate, zinc hydroxide carbonate, anhydrous zinc carbonate, basic zinc carbonate hydrate, (basic) zinc silicate, zinc hexafluorosilicate, zinc hexafluorosilicate hexahydrate, zinc stannate, zinc magnesium aluminum hydroxide carbonate, and zinc salts of the oxo acids of the fifth main group (zinc nitrate, zinc nitrate hexahydrate, nitrites, zinc phosphate, zinc pyrophosphate).

Preference is also given to zinc salts of the oxo acids of the sixth main group (zinc sulfate, zinc sulfate monohydrate, zinc heptahydrate) and zinc salts of the oxo acids of the seventh main group (hypohalites, halites, halates, e.g. zinc iodate, and perhalates, e.g. zinc perchlorate).

Preference is given to zinc salts of the pseudohalides (zinc thiocyanate, zinc cyanate, zinc cyanide), and also zinc oxides, zinc peroxides (e.g. zinc peroxide), zinc hydroxides, or mixed zinc oxide hydroxides (standard zinc oxide, e.g. from Grillo, activated zinc oxide, e.g. from Rheinchemie, zincite, calamine).

Preference is given to zinc salts of the oxo acids of the transition metals (zinc chromate(VI) hydroxide (zinc yellow), zinc chromite, zinc molybdate, e.g. Kemgard 911 B, zinc permanganate, zinc molybdate-magnesium silicate, e.g. Kemgard 911 C).

Preferred zinc salts are those having organic anions, among these are zinc slats of mono-, di-, oligo-, or polycarboxylic acids (salts of formic acid (zinc formates), of acetic acid (zinc acetates, zinc acetate dihydrate, Galzin), of trifluoroacetic acid (zinc trifluoroacetate hydrate), zinc propionate, zinc butyrate, zinc valerate, zinc caprylate, zinc oleate, zinc stearate, of oxalic acid (zinc oxalate), of tartaric acid (zinc tartrate), of citric acid (tribasic zinc citrate dihydrate), benzoic acid (benzoate), zinc salicylate, lactic acid (zinc lactate, zinc lactate trihydrate), acrylic acid, maleic acid, succinic acid, of amino acids (glycine), of acidic hydroxy functions (zinc phenolate, etc), zinc para-phenolsulfonate, zinc para-phenolsulfonate hydrate, zinc acetylacetonate hydrate, zinc tannate, zinc dimethyldithiocarbamate, zinc trifluoromethanesulfonate.

Zinc phosphide, zinc selenide, zinc telluride are also preferred.

Preference is given to metallic titanium or titanium salts having inorganic anions, e.g. chloride, nitrate, or sulfate, or else having organic anions, e.g. formate or acetate ions. Particular preference is given to titanium dichloride, titanium sesquisulfate, titanium(IV) bromide, titanium(IV) fluoride, titanium(III) chloride, titanium(IV) chloride, titanium(IV) chloride tetrahydrofuran complex, titanium(IV) oxychloride, titanium(IV) oxychloride-hydrochloric acid solution, titanium(IV) oxysulfate, titanium(IV) oxysulfate-sulfuric acid solution, and titanium oxides.

Among the tin compounds, preference is given to metallic tin and tin salts (stannous chloride, stannous chloride dihydrate, stannic chloride) and tin oxides.

Among the zirconium compounds, preference is given to metallic zirconium and zirconium salts, such as zirconium (IV) chloride, zirconium sulfate, zirconium sulfate tetrahydrate, zirconyl acetate, zirconyl chloride, zirconyl chloride octahydrate, and zirconium oxides.

In the process for preparing a phosphorus-containing flame retardant formulation for cellulose-containing moldings, dicyandiamide, formaldehyde and solvent are mixed at from 10 to 300° C. for from 0.1 to 100 h. The pH is optionally adjusted via mixing to incorporate pH modifiers at from 10 to 300° C. for from 0.1 to 100 h. Preference is given to a pH of from 8 to 13. Mono- or polyfunctional amines are optionally incorporated by mixing at from 10 to 300° C. for from 0.1 to 100 h. The inventive particulate and/or non-particulate phosphorus-containing flame retardants are incorporated by mixing at from 10 to 300° C. for from 0.1 to 100 h. Aluminum compounds and/or titanium compounds and/or zinc compounds and/or tin compounds and/or zirconium compounds are optionally incorporated by mixing at from 10 to 300° C. for from 0.1 to 100 h.

In a second process, dicyandiamide, formaldehyde and solvent are mixed at from 10 to 300° C. for from 0.1 to 100 h. The pH is optionally adjusted via incorporation of pH modifiers by mixing at from 10 to 300° C. for from 0.1 to 100 h. Preference is given to a pH of from 8 to 13. Mono- or polyfunctional amines are optionally incorporated by mixing at from 10 to 300° C. for from 0.1 to 100 h. Aluminum compounds and/or titanium compounds and/or zinc compounds and/or tin compounds and/or zirconium compounds are optionally incorporated by mixing at from 10 to 300° C. for from 0.1 to 100 h. The inventive particulate and/or non-particulate phosphorus-containing flame retardants are incorporated by mixing at from 10 to 300° C. for from 0.1 to 100 h.

In the next process, to prepare component E, dicyandiamide, formaldehyde and solvent are mixed at from 10 to 300° C. for from 0.1 to 100 h. The pH is optionally adjusted via mixing to incorporate pH modifiers at from 10 to 300° C. for from 0.1 to 100 h. Preference is given to a pH of from 8 to 13. Mono- or polyfunctional amines are optionally incorporated by mixing at from 10 to 300° C. for from 0.1 to 100 h.

The non-particulate phosphorus-containing flame retardants are incorporated by mixing as component D at from 10 to 300° C. for from 0.1 to 100 h, and then the aluminum compounds and/or titanium compounds and/or zinc compounds and/or tin compounds and/or zirconium compounds are incorporated by mixing as component B at from 10 to 300° C. for from 0.1 to 100 h.

Each of the abovementioned components may be used in the form of a solution of strength from 1 to 99% by weight, in order to improve capability for incorporation.

If the two components dicyandiamine resin and polyaluminum hydroxy compound are used in the form of a mixture, a mixing ratio recommended is from 60:40 to 5:95.

Paper

Many types of paper, e.g. paper for writing, printing, or for labels, have to be sized in order to obtain a controlled level of resistance to the penetration of aqueous liquids and to become writable and printable.

The sizing of the papers may either be carried out in bulk ("engine sizing") or via impregnation of the finished paper web ("surface sizing").

The most familiar form of engine sizing is the rosin process (rosin sizing process), in which the rosin is deposited on the fiber under acidic manufacturing conditions, using aluminum sulfate.

Among rosin sizes, a distinction is drawn between rosin soaps (aqueous solutions of alkali metal salts of the rosin (mostly 50% strength by weight in commercially available form, e.g. Dynakoll from Eka Chemicals) and anionic (e.g. Bewosol from Eka Chemicals) or cationic (Composize from Eka Chemicals) rosin dispersions. Natural sizes which may be mentioned here are rosin, animal size, casein, starch, waxes, fatty acids, and tall resins, and synthetic sizes which may be particularly highlighted, based on ketene dimers, on acrylic acids, on maleic anhydrides, or on polyvinyl acetates. The inventive means are also similarly suitable for modified sizes (e.g. rosin with dienophilic acids).

Alongside the rosin-based engine sizes there is also the group of the synthetic or reactive engine sizes. They, too, are added to the paper stock prior to sheet formation. A distinction is drawn between AKD sizing (alkylketene dimer (AKD) size based on natural fatty acids, e.g. palmitic and stearic acid) and ASA size (alkenylsuccinic anhydride size based on long-chain olefins (carbon chain length from 16 to 20) and maleic anhydride.

The use of the sizes in the composition is similar to that of rosin size. The pH of the fiber suspension is generally from 3.5 to 6.5. The sizes are added at a concentration of from 0.1 to 5 percent by weight, preferably from 0.5 to 3 percent by weight, based on dry fiber, to the paper fiber suspensions.

In the case of surface sizing of paper, a previously formed paper web is impregnated with the aqueous solution comprising sizes or with a dispersion of the sizes. Preferred sizes for surface sizing are starch, carboxymethylcellulose, alginate, alkali metal salt solutions of styrene-maleic anhydride polymers or of styrene-acrylic acid copolymers, or microemulsions of copolymers composed of styrene-acrylic derivatives (Jetsize Basis SAE from Eka Chemicals), or of modified polyurethanes (Jetsize Basis PU from Eka Chemicals), or alkylketene dimer dispersions (Jetsize Basis AKD from Eka Chemicals). In order to achieve good sizing, the base paper is intended to comprise at least 0.5 percent by weight, preferably from 1 to 4 percent by weight, of alum.

Other Paper-Additives

Wet-Strength Agents

Preferred wet-strength agents comprise two product groups: urea-formaldehyde (UF) resins for paperboard and papers produced under acidic conditions, and polyamide-amine-epichlorohydrin (PAAE) resins for neutral and alkaline process conditions.

Pulp

Preferred pulps are obtained from conifers, e.g. spruce, fir, pine, or from hardwood, i.e. deciduous trees, e.g. birch, beech, poplar, and the pulp is produced by conventional processes, e.g. the sulfite process or especially the sulfate process. Examples are spruce, beech, or birch sulfate pulp, softwood bisulfite pulp, softwood sulfite pulp, semichemical pulp composed of hardwood (bisulfite pulps, neutral sulfite pulps, bleached neutral sulfite pulps), very-high-yield pulps composed of soft-and hardwood (bisulfite pulps, neutral sulfite pulps, cold alkali pulps), straw pulps (neutral sulfite pulps, cold alkali pulps), rayon. The fiber suspension also comprises groundwood, if appropriate. The fiber suspension may also comprise used paper. Use may also be made of pulp suspensions produced by the process known as CMP or CTMP (chemimechanical and chemithermomechanical pulping processes).

Fillers

Preferred organic fillers are synthetic pigments, e.g. polycondensates composed of urea or melamine and formaldehyde with large specific surface areas, present in fine-particle form.

Preferred mineral fillers are titanium dioxide, zinc oxide, calcium sulfate, barium sulfate, barium carbonate, magnesites, kaolin, aluminum silicates, calcium silicates, oxide hydrates of aluminum, talc, satin white, China clay, calcium carbonate in fine-particle form, precipitated chalks. The fiber suspension generally comprises from 0 to 40% by weight, preferably from 5 to 25% by weight, in particular from 15 to 20% by weight, based on the solids content of the fiber suspension, of dry weight of fillers of the stated type.

Retention Aids

Retention aids retain the solid constituents of the paper stock on the screen in the paper machine. Examples of suitable retention aids are polyethyleneimine, polyacrylamides (Eka PL from Eka Chemicals), and polyaminoamides, the amounts of these added to the pulp being from 0.04 to 0.1% by weight (solids, based on dry pulp). DE2459165 74-12-14 BASF.doc In the process for providing flame retardancy to paper, cardboard, or paperboard, engine sizing comprises addition of phosphorus-containing flame retardant formulation (composed of the resin of an organic nitrogen compound and of particulate phosphorus-containing flame retardant) to the fiber suspension.

In the process for providing flame retardancy to paper, cardboard, or paperboard, engine sizing comprises adding phosphorus-containing flame retardant formulation (composed of the resin of an organic nitrogen compound and of a particulate or non-particulate phosphorus-containing flame retardant and, if appropriate of an aluminum compound and/or titanium compound and/or zinc compound and/or tin compound and/or zirconium compound) to the fiber suspension.

The decomposition temperature of the inventive phosphorus-containing flame retardant formulation is above 250° C., preferably above 300° C.

Textiles

WO-A-98/24604 discloses flame-retardant impregnating materials for wood, paper, and textiles, based on ammonium phosphates, on phosphoric acid, and on water-soluble salts which with phosphate ions can form salts insoluble in water.

U.S. Pat. No. 4,073,617 discloses flame retardants for textile materials, composed of dicyandiamide, which is condensed with formaldehyde and with phosphoric acid and then is diluted with water and applied to the cellulose-containing textile (cotton, rayon, polyester/cotton blend).

The inventive flame retardant formulation is applied to the cellulose-containing textiles via impregnation. Preferred textiles are cotton, rayon, wool, and mixed fabrics.

A preferred process for the impregnation of textiles is application of the impregnating solution to the fabric via immersion. The amount used of the dry weight of the impregnating solution can be from 1 to 25% by weight, based on the dry weight of the fabric. It is then preferable to remove the excess liquid by squeezing and to dry at from 30 to 300° C. The ratio by weight of fabric to impregnating material after drying is therefore from 8:2 to 9:1.

A preferred process for the impregnation of textiles is application of the impregnating solution to the fabric via spray-application. The amount used of the dry weight of the impregnating solution can be from 5 to 25% by weight, based on the dry weight of the fabric. It is then preferable to remove the excess liquid by squeezing and to dry at from 30 to 300° C. The ratio by weight of fabric to impregnating material after drying is therefore from 8:2 to 9:1.

Impregnation of Wood

Other cellulose-containing moldings may be: veneer wood, veneer board, blockboard, laminated wood, chipboard, particle board, wood-fiber board (hard, medium-hardness, and porous), plywood, polymer-treated wood, parquet, composite wood products, chopped wood, timber, sawn timber boards (spruce, pine), sawn construction-grade timber, etc.

For impregnation of wood, it is preferable to use a pressure-vacuum process. For this, the wood is introduced into the impregnation system and exposed to a pressure of 50 mbar for at least 20 minutes. The impregnating solution is pumped into the pressure vessel, and the wood is impregnated at a pressure of 16 bar for from 1 to 10 h.

Preference is given to an impregnating solution with from 1 to 50% by weight of active substance. The timber is preferably dried at 60° C. in a timber dryer with slowly falling humidity. After drying, the timber comprises from 1 to 40% by weight of the impregnating material (based on the dry weight of dry timber).

Another preferred process for impregnation of wood is wood-coating. Preferred processes are dipping, spraying, or spreading processes. The examples below illustrate the invention.

Expansion

A specimen is stored for 24 h at 250° C. in a drying cabinet and then sampled visually.

Initial Solubility 10 g of a specimen are stirred at 90° C. for 1 h in 100 g of demineralized water, and removed by filtration, and the filtrate is analyzed for phosphorus. The phosphorus content is used to calculate the amount of phosphorus-containing flame retardant.

EXAMPLE 1

2.7 parts by weight of dicyandiamide, 7.1 parts by weight of 30% strength aqueous formaldehyde, 1.4 parts by weight of ammonium chloride, and 1223.8 parts by weight of water are used as initial charge in a three-necked round-bottomed flask with superposed reflux condenser. 0.2 part by weight of ethylenediamine is added, with stirring, and the mixture is heated to 90-95° C. After about 10 min, the reaction is complete. 138 parts by weight of Exolit OP 930 (TP) are then incorporated by stirring, and the mixture is heated to 100° C. for a further 10 min, and cooled.

EXAMPLE 2

As in Example 1, 13.5 parts by weight of dicyandiamide, 35.4 parts by weight of 30% strength aqueous formaldehyde, 6.9 parts by weight of ammonium chloride, 1173.8 parts by weight of water, 1.0 part by weight of ethylenediamine, and 138 parts by weight of Exolit OP 930 (TP) are reacted in a three-necked round-bottomed flask with superposed reflux condenser.

EXAMPLE 3

As in Example 1, 27 parts by weight of dicyandiamide, 70.8 parts by weight of 30% strength aqueous formaldehyde, 13.8 parts by weight of ammonium chloride, 1123.8 parts by weight of water, 1.9 parts by weight of ethylenediamine, and 138 parts by weight of Exolit OP 930 (TP) are reacted in a three-necked round-bottomed flask with superposed reflux condenser.

EXAMPLE 4

As in Example 1, 27 parts by weight of dicyandiamide, 70.8 parts by weight of 30% strength aqueous formaldehyde, 13.8 parts by weight of ammonium chloride, 113.8 parts by weight of water, 1.9 parts by weight of ethylenediamine, and 27.6 parts by weight of Exolit OP 930 (TP) are reacted in a three-necked round-bottomed flask with superposed reflux condenser.

EXAMPLE 5

As in Example 1, 27 parts by weight of dicyandiamide, 70.8 parts by weight of 30% strength aqueous formaldehyde, 13.8 parts by weight of ammonium chloride, 143.8 parts by weight of water, 1.9 parts by weight of ethylenediamine, and 13.8 parts by weight of Exolit OP 930 (TP) are reacted in a three-necked round-bottomed flask with superposed reflux condenser.

EXAMPLE 6

27 parts by weight of dicyandiamide, 70.8 parts by weight of 30% strength aqueous formaldehyde, 13.8 parts by weight of ammonium chloride, and 13.8 parts by weight of water are used as initial charge in a three-necked round-bottomed flask with superposed reflux condenser. 1.9 parts by weight of ethylenediamine are added, with stirring, and the mixture is heated to 90-95° C. for 10 min. 106 parts by weight of polyaluminum chloride solution are then added, and the mixture is heated to 100° C. for a further 10 min, and finally 14.5 parts by weight of sodium diethylphosphinate solution are added, and the mixture is heated to 100° C. for a further 10 min, and then cooled.

EXAMPLE 7

As in Example 6, 27 parts by weight of dicyandiamide, 70.8 parts by weight of 30% strength aqueous formaldehyde, 13.8 parts by weight of ammonium chloride, 1.9 parts by weight of ethylenediamine, 723.8 parts by weight of water, 106 parts by weight of polyaluminum chloride solution, 434 parts by weight of sodium diethylphosphinate solution are reacted.

EXAMPLE 8

27 parts by weight of dicyandiamide, 70.8 parts by weight of 30% strength aqueous formaldehyde, 13.8 parts by weight of ammonium chloride, and 13.8 parts by weight of water are used as initial charge in a three-necked round-bottomed flask with superposed reflux condenser. 1.9 parts by weight of ethylenediamine are added, with stirring, and the mixture is heated to 90-95° C. for 10 min. 106 parts by weight of polyaluminum chloride solution are then added, and the mixture is heated to 100° C. for a further 10 min, and finally 4.3 parts by weight of diethylphosphinic acid are added, and the mixture is heated to 100° C. for a further 10 min, and then cooled.

EXAMPLE 9

As in Example 8, 27 parts by weight of dicyandiamide, 70.8 parts by weight of 30% strength aqueous formaldehyde, 13.8 parts by weight of ammonium chloride, 1.9 parts by weight of ethylenediamine, 13.8 parts by weight of water, 106 parts by weight of polyaluminum chloride solution, 129.5 parts by weight of diethylphosphinic acid are reacted.

EXAMPLE 10

As in Example 8, 27 parts by weight of dicyandiamide, 70.8 parts by weight of 30% strength aqueous formaldehyde, 13.8 parts by weight of ammonium chloride, 1.9 parts by weight of ethylenediamine, 13.8 parts by weight of water, 106 parts by weight of polyaluminum chloride, 215.9 parts by weight of diethylphosphinic acid are reacted.

EXAMPLE 11

2.7 parts by weight of dicyandiamide, 7.1 parts by weight of 30% strength aqueous formaldehyde, 1.4 parts by weight of ammonium chloride, and 701.4 parts by weight of water are used as initial charge in a three-necked round-bottomed flask with superposed reflux condenser. 0.2 part of ethylenediamine are added, with stirring, and the mixture is heated to 90-95° C. for 10 min. 223.9 parts by weight of aluminum sulfate solution are then added, and the mixture is heated to 100° C. for a further 10 min, and finally 434 parts by weight of sodium diethylphosphinate solution are added, and the mixture is heated to 100° C. for a further 10 min, and then cooled.

EXAMPLE 12

As in Example 11, 13.5 parts by weight of dicyandiamide, 35.4 parts by weight of 30% strength aqueous formaldehyde, 6.9 parts by weight of ammonium chloride, 1.0 part by weight of ethylenediamine, 656.9 parts by weight of water, 223.9 parts by weight of aluminum sulfate solution, 434 parts by weight of sodium diethylphosphinate solution are reacted.

EXAMPLE 13

As in Example 11, 27 parts by weight of dicyandiamide, 70.8 parts by weight of 30% strength aqueous formaldehyde, 13.8 parts by weight of ammonium chloride, 1.9 parts by weight of ethylenediamine, 603.8 parts by weight of water, 223.9 parts by weight of aluminum sulfate solution, 434 parts by weight of sodium diethylphosphinate solution are reacted.

EXAMPLE 14

As in Example 11, 135.2 parts by weight of dicyandiamide, 354 parts by weight of 30% strength aqueous formaldehyde, 69.2 parts by weight of ammonium chloride, 9.7 parts by weight of ethylenediamine, 151.2 parts by weight of water, 223.9 parts by weight of aluminum sulfate solution, 434 parts by weight of sodium diethylphosphinate solution are reacted.

EXAMPLE 15

As in Example 11, 135.2 parts by weight of dicyandiamide, 354 parts by weight of 30% strength aqueous formaldehyde, 69.2 parts by weight of ammonium chloride, 9.7 parts by weight of ethylenediamine, 481.9 parts by weight of water, 112 parts by weight of aluminum sulfate solution, 217 parts by weight of sodium diethylphosphinate solution are reacted.

EXAMPLE 16

As in Example 11, 27 parts by weight of dicyandiamide, 70.8 parts by weight of 30% strength aqueous formaldehyde, 13.8 parts by weight of ammonium chloride, 1.9 parts by weight of ethylenediamine, 603.8 parts by weight of water, 223.9 parts by weight of aluminum sulfate solution, 43.4 parts by weight of sodium diethylphosphinate solution are reacted.

EXAMPLE 17

A two-component impregnating solution is prepared as follows.

Component 1: 2.7 parts by weight of dicyandiamide, 7.1 parts by weight of 30% strength aqueous formaldehyde, 1.4 parts by weight of ammonium chloride, and 201.4 parts by weight of water are used as initial charge in a three-necked round-bottomed flask with superposed reflux condenser. 0.2 part by weight of ethylenediamine is added with stirring, and the mixture is heated to 90-95° C. for 10 min. 223.9 parts by weight of aluminum sulfate solution are then added and the mixture is heated to 100° C. for a further 10 min, and then cooled.

Component 2: 434 parts by weight of sodium diethylphosphinate solution are mixed with 500 parts by weight of water.

EXAMPLE 18

A two-component impregnating solution is prepared as follows.

Component 1: As in Example 17, 27 parts by weight of dicyandiamide, 70.8 parts by weight of 30% strength aqueous formaldehyde, 13.8 parts by weight of ammonium chloride, 1.9 parts by weight of ethylenediamine, 103.8 parts by weight of water, and 223.9 parts by weight of aluminum sulfate solution are reacted.

Component 2: 434 parts by weight of sodium diethylphosphinate solution are mixed with 500 parts by weight of water.

EXAMPLE 19

A two-component impregnating solution is prepared as follows.

Component 1: As in Example 17, 135.2 parts by weight of dicyandiamide, 354 parts by weight of 30% strength aqueous formaldehyde, 69.2 parts by weight of ammonium chloride, 9.7 parts by weight of ethylenediamine, 481.9 parts by weight of water, and 112 parts by weight of aluminum sulfate solution are reacted.

Component 2: 217 parts by weight of sodium diethylphosphinate at original concentration.

EXAMPLE 20

A three component impregnating solution is prepared as follows.

Component 1: 27 parts by weight of dicyandiamide, 70.8 parts by weight of 30% strength aqueous formaldehyde, 13.8 parts by weight of ammonium chloride, and 603.8 parts by weight of water are used as initial charge in a three-necked round-bottomed flask with superposed reflux condenser. 1.9 parts by weight of ethylenediamine are added with stirring, and the mixture is heated to 90-95° C. for 10 min, and then cooled.

Component 2: 223.9 parts by weight of aluminum sulfate solution at original concentration.

Component 3: 434 parts by weight of sodium diethylphosphinate solution at original concentration.

EXAMPLE 21

2.7 parts by weight of dicyandiamide, 7.1 parts by weight of 30% strength aqueous formaldehyde, 1.4 parts by weight of ammonium chloride and 366.4 parts by weight of water are used as initial charge in a three-necked round-bottomed flask with superposed reflux condenser. 0.2 part by weight of ethylenediamine are added with stirring and the mixture is heated to 90-95° C. for 10 min. 39.3 parts by weight of diethylphosphinic acid are then added and the mixture is heated to 100° C. for a further 10 min, and then cooled.

EXAMPLE 22

As in Example 21, 27 parts by weight of dicyandiamide, 70.8 parts by weight of 30% strength aqueous formaldehyde, 13.8 parts by weight of ammonium chloride, 1.9 parts by weight of ethylenediamine, 263.8 parts by weight of water, and 39.3 parts by weight of diethylphosphinic acid are reacted.

EXAMPLE 23

As in Example 21, 27 parts by weight of dicyandiamide, 70.8 parts by weight of 30% strength aqueous formaldehyde, 13.8 parts by weight of ammonium chloride, 1.9 parts by weight of ethylenediamine, 263.8 parts by weight of water, and 3.9 parts by weight of diethylphosphinic acid are reacted.

EXAMPLE 24

27 parts by weight of dicyandiamide, 70.8 parts by weight of 30% strength aqueous formaldehyde, and 273.8 parts by weight of water are used as initial charge in a three-necked round-bottomed flask with superposed reflux condenser. A pH of 10 is set using sodium hydroxide, and the mixture is heated to 90-95° C., at which it is stirred for 10 min. 39.3 parts by weight of diethylphosphinic acid are then added and the mixture is heated to 100° C. for a further 10 min, and then cooled.

EXAMPLE 25

A fiber suspension composed of bleached birch sulfate pulp and pine sulfate pulp in a ratio of 1:1 by weight in water of 10° dH (German hardness), and having a solids content of 0.5% by weight, is treated with 20% by weight of chalk as filler and then with 0.01% by weight of Percol 292 (cationic polyacrylamide (MW>1*10$^7$)) as aid to retention of very fine cellulose fiber particles. The amounts of chalk and of aid are based on the solids content of the fiber suspension. 0.9 part of flame retardant of Example 2 and 0.25% by weight of the active substance Polymin$^R$ P (polyethyleneimine with molecular weight of from 10,000 to 100,000) as retention aid were also added to 100 parts of suspension.

Standard sheets whose weight per unit area is 80 g/qm were produced on a Rapid Köthen laboratory sheet-forming machine from 100% by weight of bleached spruce sulfite pulp, adding the sizes stated in Table 1. The sheets were then dried at 120° C. for 3 min.

The flame retardant content is about 15% by weight, and the phosphorus content is about 3.1% by weight.

Fire Tests

Paper strips (width 1 cm, length 20 cm) were secured at 45° inclination in a combustion chamber, for protection from drafts. The tip of a non-luminous Bunsen burner flame (natural gas) of length 15 cm is applied to one end for 5 sec. The afterflame time is recorded.

EXAMPLE 25a

Using a method based on Example 25, 1 g of flame retardant of Example 1 is added to a fiber suspension, and standard sheets are produced with a flame retardant content of about 15% by weight and with a phosphorus content of about 3.1% by weight.

EXAMPLE 26

Using a method based on Example 25, 0.8 g of flame retardant of Example 3 is added to a fiber suspension, and standard sheets are produced with a flame retardant content of about 15% by weight and with a phosphorus content of about 2.7% by weight.

EXAMPLE 27

Using a method based on Example 25, 0.1 g of flame retardant of Example 4 is added to a fiber suspension, and standard sheets are produced with a flame retardant content of about 5% by weight and with a phosphorus content of about 0.4% by weight.

EXAMPLE 27a

Using a method based on Example 25, 0.45 g of flame retardant of Example 5 is added to a fiber suspension, and standard sheets are produced with a flame retardant content of about 15% by weight and with a phosphorus content of about 0.8% by weight.

EXAMPLE 27b

Using a method based on Example 25, 0.5 g of flame retardant of Example 6 is added to a fiber suspension, and standard sheets are produced with a flame retardant content of about 15% by weight and with a phosphorus content of about 0.3% by weight.

EXAMPLE 28

Using a method based on Example 25, 0.8 g of flame retardant of Example 7 is added to a fiber suspension, and standard sheets are produced with a flame retardant content of about 15% by weight and with a phosphorus content of about 2.7% by weight.

EXAMPLE 28a

Using a method based on Example 25, 1 g of flame retardant of Example 8 is added to a fiber suspension, and standard sheets are produced with a flame retardant content of about 53% by weight and with a phosphorus content of about 0.1% by weight.

EXAMPLE 29

Using a method based on Example 25, 0.2 g of flame retardant of Example 9 is added to a fiber suspension, and standard sheets are produced with a flame retardant content of about 14% by weight and with a phosphorus content of about 2.6% by weight.

EXAMPLE 30

Using a method based on Example 25, 1 g of flame retardant of Example 11 is added to a fiber suspension, and standard sheets are produced with a flame retardant content of about 15% by weight and with a phosphorus content of about 3.4% by weight.

EXAMPLE 31

Using a method based on Example 25, 0.8 g of flame retardant of Example 13 is added to a fiber suspension, and standard sheets are produced with a flame retardant content of about 15% by weight and with a phosphorus content of about 2.7% by weight.

EXAMPLE 32

Using a method based on Example 25, 0.5 g of flame retardant of Example 15 is added to a fiber suspension, and standard sheets are produced with a flame retardant content of about 16% by weight and with a phosphorus content of about 0.8% by weight.

EXAMPLE 32a

Using a method based on Example 25, 1 g of flame retardant of Example 17 is added to a fiber suspension, and standard sheets are produced with a flame retardant content of about 15% by weight and with a phosphorus content of about 3.4% by weight.

EXAMPLE 32b

Using a method based on Example 25, 0.8 g of flame retardant of Example 18 is added to a fiber suspension, and standard sheets are produced with a flame retardant content of about 15% by weight and with a phosphorus content of about 2.7% by weight.

EXAMPLE 33

Using a method based on Example 25, 0.5 g of flame retardant of Example 22 is added to a fiber suspension, and standard sheets are produced with a flame retardant content of about 15% by weight and with a phosphorus content of about 6.7% by weight.

EXAMPLE 34

Using a method based on Example 25, 0.5 g of flame retardant of Example 24 is added to a fiber suspension, and standard sheets are produced with a flame retardant content of about 15% by weight and with a phosphorus content of about 6.8% by weight.

EXAMPLE 35

In accordance with Example 16 of U.S. Pat. No. 4,219,456, paper strips (80 g/qm, width 1 cm, length 20 cm) are dipped into a 6% strength coating solution for 1 minute, allowed to drip dry, and dried for 10 minutes at 110° C. The flame retardant content (weight increase, based on dry weight) is about 15% by weight, and the phosphorus content is 3.1% by weight.

EXAMPLE 36

A coating solution 1, based on component 1 of Example 18, is prepared by diluting component 1 of Example 18 with demineralized water at 1:1.

A coating solution 2, based on component 2 of Example 18, is prepared by diluting component 2 of Example 18 with demineralized water at 1:1.

In accordance with Example 35, paper strips (80 g/qm, width 1 cm, length 20 cm) are dipped into a coating solution 1 for 1 minute, allowed to drip dry, and dried for 10 minutes at 110° C. The paper strip is then dipped into a coating solution 2 for 1 minute, allowed to drip dry, and dried at 110° C. for 10 minutes.

The flame retardant content (weight increase, based on dry weight) is about 15% by weight, and the phosphorus content is 2.7% by weight.

EXAMPLE 37

A coating solution based on component 1 of Example 22 is prepared by diluting the flame retardant solution of Example 22 with demineralized water at 1:2.5.

In accordance with Example 35, paper strips (80 g/qm, width 1 cm, length 20 cm) are dipped into the coating solution for 1 minute, allowed to drip dry, and dried for 10 minutes at 110° C. The flame retardant content (weight increase, based on dry weight) is about 15% by weight, and the phosphorus content is 6.7% by weight.

Textiles

Fire Tests

The textile specimens were suspended vertically. A Bunsen burner flame of height four cm was applied for 10 sec under each textile specimen. The fire tests investigated whether visible flames emerged from the specimen during the test. Once the flame had been removed, any ignition and/or further smoldering of the textiles was observed. The height of the carbonized area was measured in millimeters from the lowest edge of the specimen to the upper limit of the carbonized area.

EXAMPLE 38 COMPARISON

Pieces of cotton fabric (100*115 mm, weight per unit area 140 g/qm) are immersed in accordance with Example BB of WO 98/24604 in an impregnating solution composed of 1.35% by weight of dicyandiamide, 11.6% by weight of monoammonium phosphate, 1.87% by weight of phosphoric acid, 0.11% by weight of magnesium hydroxide, 0.13% by weight of ammonium carbonate, 0.04% by weight of additive, and 85% by weight of water, and soaked. The impregnating solution comprises 15% by weight of active substance. After the soaking process, the pieces of fabric are squeezed dry and dried at 110° C. in a drying cabinet. The weight increase due to impregnation is 10% by weight and the phosphorus content is 2.1% by weight. The combustion behavior of the fabric specimen is studied. It does not ignite, exhibits no afterglow, and generates no smoke, and the dimension of the carbonized area is 53 mm (diameter).

EXAMPLE 39

A coating solution is prepared by taking 8.3 g of the flame retardant solution of Example 22 and making this up to 100 g with demineralized water.

Using a method based on Example 38, pieces of textile are saturated with the coating solution and dried. The flame retardant content (weight increase, based on dry weight) is about 4.6% by weight, and the phosphorus content is 2.1% by weight. The combustion behavior of the fabric specimen is studied. It does not ignite, exhibits no afterglow, and generates no smoke, and the dimension of the carbonized area is 44 mm (diameter).

EXAMPLE 40

A coating solution is prepared by taking 21.2 g of the flame retardant solution of Example 7 and making this up to 100 g with demineralized water.

Using a method based on Example 38, pieces of textile are saturated with the coating solution and dried. The flame retardant content (weight increase, based on dry weight) is about 12% by weight, and the phosphorus content is 2.1% by weight. The combustion behavior of the fabric specimen is studied. It does not ignite, exhibits no afterglow, and generates no smoke, and the dimension of the carbonized area is 39 mm (diameter).

Wood

Fire Tests

After drying for two days, the boards are exposed at a distance of 14 cm to heat of intensity $1\ cal*cm^{-2}*sec^{-1}$. A gas flame applied to the board ignites the combustible gases liberated from the board.

EXAMPLE 41

As in Example 2 of GB 1 055 555, a layer (400 g/m², corresponding to about 0.5% by weight of phosphorus, based on the weight of board plus coating) of a two-component flame retardant formulation based on dicyandiamide-formaldehyde resin is spread on sprucewood boards (10×10×2 cm). The average ignition time was from 10 to 11 min. Untreated sprucewood boards gave ignition after as little as 25-35 sec.

EXAMPLE 42

As in Example 41, a layer (325 g/m2, corresponding to about 0.5% by weight of phosphorus, based on the weight of board plus coating) of the flame retardant formulation of Example 13 was spread on sprucewood boards. The average ignition time was 15 min.

EXAMPLE 43

As in Example 41, a layer (500 g/m2, corresponding to about 0.5% by weight of phosphorus, based on the weight of board plus coating) of the flame retardant formulation of Example 22 was spread on sprucewood boards. The average ignition time was 16 min.

EXAMPLE 44

Sprucewood boards (10×10×2 cm) with moisture content 19% by weight are coated in an autoclave. The impregnating solution of Example 13 is charged to the autoclave, which is heated at 6.9 bar for 60 min by external electrical heating. The impregnating solution is then discharged and the boards are allowed to drip dry, and are dried at room temperature for a period of 5 days to moisture content below 19% by weight. The amount of flame retardant absorbed was about 3 g. The average ignition time was 16 min.

EXAMPLE 45

Using a method based on Example 44, the impregnating solution of Example 22 was used to impregnate sprucewood boards in an autoclave. The amount of flame retardant absorbed was about 5 g. The average ignition time was 14 min.

EXAMPLE 46

A sodium diphenylphosphinate solution is prepared by dissolving firstly 42.4 parts by weight of sodium hydroxide and then 231.5 parts by weight of diphenylphosphinic acid in 281.3 parts by weight of water.

27 parts by weight of dicyandiamide, 70.8 parts by weight of 30% strength aqueous formaldehyde, 13.8 parts by weight of ammonium chloride, and 604.6 parts by weight of water are used as initial charge in a three-necked round-bottomed flask with superposed reflux condenser. 1.9 parts by weight of ethylenediamine are added, with stirring, and the mixture is heated to 90-95° C. for 10 min. 224 parts by weight of aluminum sulfate solution are then added, and the mixture is heated to 100° C. for a further 10 min, and finally the entire amount of the sodium diphenylphosphinate solution is added and the mixture is heated to 100° C. for a further 10 min, and is then cooled.

EXAMPLE 47

27 parts by weight of dicyandiamide, 70.8 parts by weight of 30% strength aqueous formaldehyde, 13.8 parts by weight of ammonium chloride, and 640.7 parts by weight of water are used as initial charge in a three-necked round-bottomed flask with superposed reflux condenser. 1.9 parts by weight of ethylenediamine are added, with stirring, and the mixture is heated to 90-95° C. for 10 min. 203.5 parts by weight of zinc sulfate heptahydrate are then added, and the mixture is heated to 100° C. for a further 10 min, and finally 434 parts by weight of sodium diphenylphosphinate solution are added and the mixture is heated to 100° C. for a further 10 min, and is then cooled.

EXAMPLE 48

27 parts by weight of dicyandiamide, 70.8 parts by weight of 30% strength aqueous formaldehyde, 13.8 parts by weight of ammonium chloride, and 707.6 parts by weight of water are used as initial charge in a three-necked round-bottomed flask with superposed reflux condenser. 1.9 parts by weight of ethylenediamine are added, with stirring, and the mixture is heated to 90-95° C. for 10 min. 50.3 parts by weight of titanium tetrachloride are then carefully metered in, followed by 42.4 parts by weight of sodium hydroxide, and then the mixture is heated to 100° C. for a further 10 min, and finally 162.7 parts by weight of sodium diethylphosphinate solution are added and the mixture is heated to 100° C. for a further 10 min, and is then cooled.

The technical advantage of the inventive phosphorus-containing flame retardant is its relatively low solubility in water when compared with ammonium-phosphate-based flame retardants.

| Substances | |
|---|---|
| Percol 292 | Twinrocker, Brookston, Indiana, USA |
| Polyamine P | BASF |
| Dicyandiamide | Lancaster |
| Aqueous formaldehyde, 30% by water | Lancaster |
| Ammonium chloride | Merck KgaA |
| Ethylenediamine | Lancaster |
| Polyaluminium hydroxychloride | Oker Chemie GmbH |
| Aluminum sulfate solution, 4.26% by weight of Al | Eka Chemicals Düren |
| Exolit OP 930 (TP) Al diethylphosphinate | Clariant |
| Zinc sulfate heptahydrate | Lancaster |
| Titanium tetrachloride | Lancaster |

TABLE 1

| Ex. | Dicyan-diamide pts. by wt. | Form-aldehyde pts. by wt | Ammonium chloride pts. by wt. | Ethylene diamine pts. by wt. | Water pts. by wt. | Polyaluminum hydroxychloride pts. by wt. | Aluminum sulfate pts. by wt. | Diethylphos-phinic acid pts. by wt. | Na diethyl-phosphinate pts. by wt. | Al diethyl-phosphinate pts. by wt. |
|---|---|---|---|---|---|---|---|---|---|---|
| 1 | 2.7 | 7.1 | 1.4 | 0.2 | 1223.8 | — | — | — | — | 138.0 |
| 2 | 13.5 | 35.4 | 6.9 | 1.0 | 1173.8 | — | — | — | — | 138.0 |
| 3 | 27.0 | 70.8 | 13.8 | 1.9 | 1123.8 | — | — | — | — | 138.0 |
| 4 | 27.0 | 70.8 | 13.8 | 1.9 | 113.8 | — | — | — | — | 27.6 |
| 5 | 27.0 | 70.8 | 13.8 | 1.9 | 143.8 | — | — | — | — | 13.8 |
| 6 | 27.0 | 70.8 | 13.8 | 1.9 | 13.8 | 106.0 | — | — | 14.5 | — |
| 7 | 27.0 | 70.8 | 13.8 | 1.9 | 723.8 | 106.0 | — | — | 434.0 | — |
| 8 | 27.0 | 70.8 | 13.8 | 1.9 | 13.8 | 106.0 | — | 4.3 | — | — |
| 9 | 27.0 | 70.8 | 13.8 | 1.9 | 13.8 | 106.0 | — | 129.5 | — | — |
| 10 | 27.0 | 70.8 | 13.8 | 1.9 | 13.8 | 106.0 | — | 215.9 | — | — |
| 11 | 2.7 | 7.1 | 1.4 | 0.2 | 701.4 | — | 223.9 | — | 434.0 | — |
| 12 | 13.5 | 35.4 | 6.9 | 1.0 | 656.9 | — | 223.9 | — | 434.0 | — |
| 13 | 27.0 | 70.8 | 13.8 | 1.9 | 603.8 | — | 223.9 | — | 434.0 | — |
| 14 | 135.2 | 354.0 | 69.2 | 9.7 | 151.9 | — | 223.9 | — | 434.0 | — |
| 15 | 135.2 | 354.0 | 69.2 | 9.7 | 481.9 | — | 112.0 | — | 217.0 | — |
| 16 | 27.0 | 70.8 | 13.8 | 1.9 | 603.8 | — | 223.9 | — | 43.4 | — |
| 17a | 2.7 | 7.1 | 1.4 | 0.2 | 201.4 | — | 223.9 | — | — | — |
| 17b | — | — | — | — | 500.0 | — | — | — | 434.0 | — |
| 18a | 27.0 | 70.8 | 13.8 | 1.9 | 103.8 | — | 223.9 | — | — | — |
| 18b | — | — | — | — | 500.0 | — | — | — | 434.0 | — |
| 19a | 135.2 | 354.0 | 69.2 | 9.7 | 481.9 | — | 112.0 | — | — | — |
| 19b | — | — | — | — | — | — | — | — | 217.0 | — |
| 20a | 27.0 | 70.8 | 13.8 | 1.9 | 603.8 | — | — | — | — | — |
| 20b | — | — | — | — | — | — | 223.9 | — | — | — |
| 20c | — | — | — | — | — | — | — | — | 434.0 | — |
| 21 | 2.7 | 7.1 | 1.4 | 0.2 | 366.4 | — | — | 39.3 | — | — |
| 22 | 27.0 | 70.8 | 13.8 | 1.9 | 263.8 | — | — | 39.3 | — | — |
| 23 | 27.0 | 70.8 | 13.8 | 1.9 | 263.8 | — | — | 3.9 | — | — |
| 24 | 27.0 | 70.8 | 0.0 | 0.0 | 273.8 | — | — | 39.3 | — | — |

TABLE 2

| Ex. | FR from Ex. | Phosphorus in paper/textile % | Combustion time s | Solubility % | Expansion |
|---|---|---|---|---|---|
| 25 | Ex. 2 | 3.1 | 2 | 0.1 | no |
| 25a | Ex. 1 | 3.4 | — | 0.2 | no |
| 26 | Ex. 3 | 2.7 | 2 | — | — |
| 27 | Ex. 4 | 0.4 | 4 | — | — |
| 27a | Ex. 5 | 0.8 | — | 0.3 | no |
| 27b | Ex. 6 | 0.3 | — | 0.1 | no |
| 28 | Ex. 7 | 2.6 | — | — | — |
| 28a | Ex. 8 | 0.1 | — | 0.2 | no |
| 29 | Ex. 9 | 0.4 | — | — | — |
| 30 | Ex. 11 | 3.4 | — | — | — |
| 31 | Ex. 13 | 2.7 | 2 | — | — |
| 32 | Ex. 15 | 0.8 | — | — | — |
| 32a | Ex. 17 | 3.4 | — | 0.3 | no |
| 32b | Ex. 18 | 2.7 | — | 0.2 | no |
| 33 | Ex. 22 | 6.7 | 2 | — | — |
| 34 | Ex. 24 | 6.8 | — | — | — |
| 35 | U.S. Pat. No. 4 219 456 ex. 16 | 3.1 | 6 | — | — |
| 36 | Ex. 18 | 2.7 | — | — | — |
| 37 | Ex. 22 | 6.7 | — | — | — |
| 38 | WO 98/24604 ex. BB | 2.1 | — | — | — |
| 39 | Ex. 22 | 2.1 | — | — | — |
| 40 | Ex. 7 | 2.1 | — | — | — |

TABLE 3

| Ex. | | 41 | 42 | 43 | 44 | 45 |
|---|---|---|---|---|---|---|
| FR formulation composed of | | Comparison | Ex. 13 | Ex. 22 | Ex. 13 | Ex. 22 |
| Applied amount of FR, 100% by weight | g | — | — | — | 3 | 5 |
| Applied amount of FR, 100% by weight | g/m$^2$ | 400 | 325 | 501 | 325 | 501 |
| P content (board + FR) | % by weight | 0.5 | 0.5 | 0.5 | 0.5 | 0.5 |

TABLE 4

| Ex. | Dicyandiamide pts. by wt. | Formaldehyde pts. by wt. | Ammonium chloride pts. by wt. | Ethylenediamine pts. by wt. | Water pts. by wt. | Aluminum sulfate pts. by wt. | Zink sulfate heptahydrate pts. by wt. | Titanium tetrachloride pts. by wt. | Diphenylphosphinic acid pts. by wt. | NaOH pts. by wt. | Water pts. by wt. | Na diethylphosphinate pts. by wt. |
|---|---|---|---|---|---|---|---|---|---|---|---|---|
| 46 | 27.0 | 70.8 | 13.8 | 1.9 | 604.6 | 224.0 | — | — | 231.5 | 42.4 | 281.3 | — |
| 47 | 27.0 | 70.8 | 13.8 | 1.9 | 640.7 | — | 203.5 | — | — | — | — | 434.0 |
| 48 | 27.0 | 70.8 | 13.8 | 1.9 | 707.6 | — | — | 50.3 | — | 42.4 | — | 162.7 |

The invention claimed is:

1. A flame retardant cellulose containing material comprising a phosphorus-containing flame retardant formulation comprising from 0.01 to 99% by weight of a cellulose containing material from 0.1 to 99% by weight of at least one dicyandiamide-formaldehyde resin and from 0.1 to 99% by weight of at least one phosphorus-containing flame retardant, wherein the at least one phosphorus-containing flame retardant is a a diphosphinic salt of the formula (II), a polymer of the diphosphinic salt or a mixture thereof

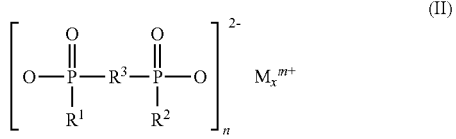

(II)

wherein $R^1$ and $R^2$ are identical or different and are $C_1$-$C_6$-alkyl, linear or branched, or aryl;

$R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Fe, Zr, Ce, Bi, Sr, Mn, Li or a protonated nitrogen base; n is from 1 to 4; x is from 1 to 4.

2. A flame-retardant cellulose-containing-material according to claim 1 comprising:

from 0.01 to 90% by weight of the cellulose from 0.01 to 90% by weight of the at least one dicyandiamide-formaldehyde resin from 0.01 to 90% by weight of the at least one non-particulate phosphorus-containing flame retardant, and from 0.01 to 90% by weight of a metal compound selected from the group consisting of an aluminum compound, titanium compound, zinc compound, tin compound, zirconium compound and mixtures thereof.

3. A flame-retardant cellulose-containing material according to claim 1 comprising:

from 0.01 to 90% by weight of the cellulose from 0.01 to 90% by weight of at least one dicyandiamide-formaldehyde resin, and from 0.01 to 90% by weight of the at least one particulate phosphorus-containing flame retardant.

4. A flame-retardant cellulose-containing material as claimed in claim 1 comprising:

from 1 to 50% by weight of the cellulose from 1 to 30% by weight of the dicyandiamide-formaldehyde resin, and from 1 to 50% by weight of the at least one particulate phosphorus-containing flame retardant.

5. The flame retardant cellulose containing material as claimed in claim 1, wherein the cellulose containing material is selected from the group consisting of paperboard, textiles and wood.

6. The phosphorus-containing flame retardant formulation as claimed in claim 1, wherein the at least one phosphorus-containing flame retardant comprises at least one particulate phosphorus-containing flame retardant.

7. The phosphorus-containing flame retardant formulation as claimed in claim 1, wherein $R^1$ and $R^2$ are identical or different and are $C_1$-$C_6$-alkyl, linear or branched, or phenyl.

8. The phosphorus-containing flame retardant formulation as claimed in claim 1, wherein $R^1$ and $R^2$ are identical or different and are methyl, ethyl, n-propyl, isopropyl, n-butyl, tert-butyl, n-pentyl, or phenyl.

9. The phosphorus-containing flame retardant formulation as claimed in claim 1, wherein $R^3$ is methylene, ethylene, n-propylene, isopropylene, n-butylene, tert-butylene, n-pentylene, n-octylene; n-dodecylene; phenylene; naphthylene; methylphenylene, ethylphenylene, tert-butylphenylene, methyl-naphthylene, ethylnaphthylene, tert-butylnaphthylene; phenylmethylene, phenyl-ethylene, phenylpropylene, or phenylbutylene.

10. The phosphorus-containing flame retardant formulation as claimed in claim 1, having a thermal stability extending to 200-500° C.

11. The phosphorus-containing flame retardant formulation as claimed in claim 6, wherein the solubility of the at least one particulate flame retardant is from 0.001 to 15% by weight in water, in organic solvents or a mixture thereof.

12. The phosphorus-containing flame retardant formulation as claimed in claim 6, wherein the median particle size $d_{50}$ of the at least one particulate flame retardant is from 1 nm to 5 mm.

13. The phosphorus-containing flame retardant formulation as claimed in claim 1, wherein $R^1$ and $R^2$ are identical or different and are $C_1$-$C_6$-alkyl, linear or branched, or aryl; $R^3$ is $C_1$-$C_{10}$-alkylene, linear or branched, $C_6$-$C_{10}$-arylene, -alkylarylene, or -arylalkylene, M is Na, K, or H, and n is 1;

x is 1.

14. The phosphorus-containing flame retardant formulation as claimed in claim 6, further comprising an aluminum compound, titanium compound, zinc compound, tin compound, zirconium compound or a mixture thereof.

15. A phosphorus-containing flame retardant formulation comprising a cellulose containing material and a two-component phosphorus-containing flame retardant formulation of from 0.1 to 99.9% by weight of a component A and from 0.1 to 99.9% by weight of a component B, where component A is from 0.1 to 99.9% by weight of at least one dicyandiamide-formaldehyde resin, and from 0.1 to 99.9% by weight of at least one non-particulate phosphorus-containing flame retardant, and component B is a metal compound selected from the group consisting of an aluminum compound, titanium compound, zinc compound, tin compound, zirconium compound and mixtures thereof, wherein the at least one non-particulate phosphorus-containing flame retardant is a diphosphinic salt of the formula (II), a polymer of the diphosphinic salt or a mixture thereof

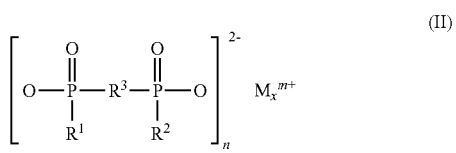

wherein
$R^1$ and $R^2$ are identical or different and are $C_1$-$C_6$-alkyl, linear or branched, or aryl;
$R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Fe, Zr, Ce, Bi, Sr, Mn, Li or a protonated nitrogen base; n is from 1 to 4; x is from 1 to 4.

16. The phosphorus-containing flame retardant formulation as claimed in claim 15, having from 68.9 to 94.2% by weight of a component A and from 31.1 to 5.83% by weight of a component B, wherein component A is from 93.7 to 12.9% by weight of the at least one dicyandiamide-formaldehyde resin and from 6.3 to 87.1% by weight of the at least one non-particulate phosphorus-containing flame retardant.

17. The phosphorus-containing flame retardant formulation as claimed in claim 15, having from 68.9 to 87.9% by weight of a component A and from 31.1 to 12.1% by weight of a component B, wherein component A is from 93.7 to 1.5% by weight of the dicyandiamide-formaldehyde resin and from 6.3 to 98.5% by weight of the at least one non-particulate phosphorus-containing flame retardant.

18. A phosphorus-containing flame retardant formulation comprising a cellulose containing material and a two-component phosphorus-containing flame retardant formulation having from 0.1 to 99.9% by weight of a component C and from 0.1 to 99.9% by weight of a component D, wherein component C is from 0.1 to 99.9% by weight of at least one dicyandiamide-formaldehyde resin and from 0.1 to 99.9% by weight of a compound selected from the group consisting of an aluminum compound, titanium compound, zinc compound, tin compound, zirconium compound and mixtures thereof, and component D is at least one non-particulate phosphorus-containing flame retardant, wherein the at least one non-particulate phosphorus-containing flame retardant is a diphosphinic salt of the formula (II), a polymer of the diphosphinic salt or a mixture thereof

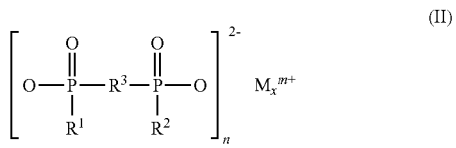

wherein
$R^1$ and $R^2$ are identical or different and are $C_1$-$C_6$-alkyl, linear or branched, or aryl;
$R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Fe, Zr, Ce, Bi, Sr, Mn, Li or a protonated nitrogen base; n is from 1 to 4; x is from 1 to 4.

19. The phosphorus-containing flame retardant formulation as claimed in claim 18, having from 13.3 to 95.6% by weight of a component C and from 86.7 to 4.4% by weight of a component D, where component C is composed of from 9.6 to 67.5% by weight of the at least one dicyandiamide-formaldehyde resin and from 90.4 to 32.5% by weight of the metal compound.

20. The phosphorus-containing flame retardant formulation as claimed in claim 18, having from 22.3 to 86.8% by weight of a component C and from 77.7 to 13.2% by weight of a component D, where component C is composed of from 51.5 to 67.5% by weight of the at least one dicyandiamide-formaldehyde resin and from 48.5 to 32.5% by weight of the metal compound.

21. A phosphorus-containing flame retardant comprising a cellulose containing material and a three-component phosphorus-containing flame retardant formulation having from 0.1 to 99.9% by weight of a component E, at least one dicyandiamide-formaldehyde resin, from 0.1 to 99.9% by weight of a component D, at least one non-particulate phosphorus-containing flame retardant, and from 0.1 to 99.9% by weight of a component B, a metal compound selected from the group consisting of an aluminum compound, titanium compound, zinc compound, tin compound, zirconium compound and mixtures thereof, wherein the at least one non-particulate phosphorus-containing flame retardant is a diphosphinic salt of the formula (II), a polymer of the diphosphinic salt or a mixture thereof

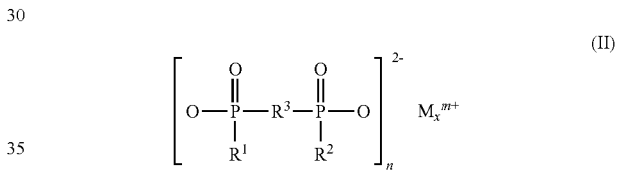

wherein
$R^1$ and $R^2$ are identical or different and are $C_1$-$C_6$-alkyl, linear or branched, or aryl;
$R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Fe, Zr, Ce, Bi, Sr, Mn, Li or a protonated nitrogen base; n is from 1 to 4; x is from 1 to 4.

22. The phosphorus-containing flame retardant formulation as claimed in claim 21, having from 1 to 65% by weight of component E, from 4 to 87% by weight of component D, and from 12 to 32% by weight of component B.

23. The phosphorus-containing flame retardant formulation as claimed in claim 21, having from 11 to 59% by weight of component E, from 13 to 78% by weight of a component D and from 12 to 38% by weight of a component B.

24. The phosphorus-containing flame retardant formulation as claimed in claim 21, wherein the at least one dicyandiamide-formaldehyde resin is a dicyandiamide resin composed of 1 mol of dicyandiamide and from 1 to 10 mol of formaldehyde.

25. The phosphorus-containing flame retardant formulation as claimed in claim 6, wherein the solubility of the at least one non-particulate flame retardant is from 20 to 100% by weight in water organic solvents or a mixture thereof.

26. The phosphorus-containing flame retardant formulation as claimed in claim 6, having from 18.8 to 69.9% by weight of the at least one dicyandiamide-formaldehyde resin and from 81.2 to 30.1% by weight of the particulate phosphorus-containing flame retardant.

27. The phosphorus-containing flame retardant formulation as claimed in claim 1, having a thermal stability extending to 250-400° C.

28. The phosphorus-containing flame retardant formulation as claimed in claim 1, wherein the solubility of the particulate flame retardant is from 0.1 to 9.9% by weight in water in organic solvents or a mixture thereof.

29. The phosphorus-containing flame retardant formulation as claimed in claim 1, wherein the median particle size $d_{50}$ of the particulate flame retardant is from 1 to 20 μm.

30. The phosphorus-containing flame retardant formulation as claimed in claim 1, having from 4.4 to 82.3% by weight of the at least one dicyandiamide-formaldehyde resin and from 95.6 to 17.7% by weight of the at least one non-particulate phosphorus-containing flame retardant.

31. The phosphorus-containing flame retardant formulation as claimed in claim 6, having from 18.8 to 69.9% by weight of the at least one dicyandiamide-formaldehyde resin and from 81.2 to 30.1% by weight of the at least one non-particulate phosphorus-containing flame retardant.

* * * * *